United States Patent

[11] 3,607,984

| [72] | Inventor | Jean-Marie Massoubre<br>Clermont-Ferrand, France |
|---|---|---|
| [21] | Appl. No. | 746,038 |
| [22] | Filed | July 19, 1968 |
| [45] | Patented | Sept. 21, 1971 |
| [73] | Assignee | Compagnie Generale Des Etablissements<br>Michelin, raison sociale Michelin & Cie<br>Clermont-Ferrand (Puy-de-Dome), France |
| [32] | Priority | July 20, 1967 |
| [33] | | France |
| [31] | | 115,078 |

[54] IMPERMEABLE ELASTOMERS OF BUTYL RUBBER MIXED WITH A CONJUGATION DIENE POLYMER HAVING 40–90 PERCENT OF ITS DOUBLE BONDS IN A LATERAL POSITION
5 Claims, 1 Drawing Fig.

[52] U.S. Cl............................................. 260/888,
260/5, 260/23.7 M, 260/41.5 R, 260/83.7,
260/94.2 M

[51] Int. Cl............................................. C08d 9/08
[50] Field of Search............................................. 260/888

[56] References Cited

UNITED STATES PATENTS

| 2,721,185 | 10/1955 | Schulze | 260/888 |
|---|---|---|---|
| 2,788,839 | 4/1957 | Kindle et al. | 260/888 |
| 3,060,989 | 10/1962 | Railsback et al. | 260/5 |

FOREIGN PATENTS

| 973,687 | 10/1964 | Great Britain | 260/888 |
|---|---|---|---|
| 992,108 | 5/1965 | Great Britain | 260/888 |

*Primary Examiner*—Samuel H. Blech
*Attorneys*—Brumbaugh, Graves, Donohue & Raymond

ABSTRACT: An impermeable elastomer which comprises a mixture of from about 50 percent to about 95 percent by weight of a butyl rubber and from about 50 percent to about 5 percent by weight respectively of a polymer of a conjugated diene having from about 40 percent to about 100 percent of its double bonds in a lateral position.

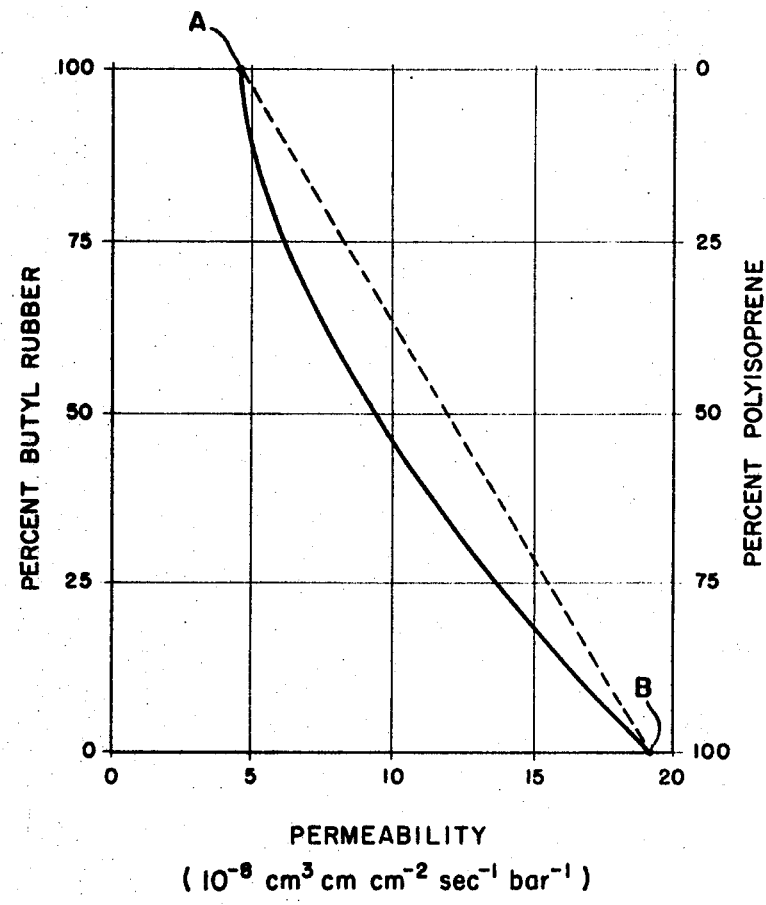

IMPERMEABLE ELASTOMERS OF BUTYL RUBBER MIXED WITH A CONJUGATION DIENE POLYMER HAVING 40–90 PERCENT OF ITS DOUBLE BONDS IN A LATERAL POSITION

The present invention relates to impermeable elastomers which are especially suitable for impervious interior coatings of tire covers to be used without inner tubes. It also relates to the vulcanizable elastomers and mixtures as well as to tire covers comprising an impervious inner coating obtained by means of the said elastomers.

In order to be satisfactory, an elastomer used for impervious coating should possess at least three qualities to a large degree.

Firstly and obviously, it is advisable that such an elastomer has very low permeability as regards gases and especially air, not only at ambient temperature but also at temperatures exceeding ambient temperature which may be as high as 80° C. or 100° C. This property is especially desirable for covers with flexible and thin sidewalls, or also for covers inflated to comparatively low pressures, such as in radial carcass tires.

It is known that the permeability of an elastomer is measured by the number of cubic centimeters of gas being diffused per second through a membrane of given surface and thickness at a given difference in pressures. For butyl rubber and at 80° C., the permeability is $5 \times 10^{18} cm^3 cm.cm^{12} sec^{11} atm.^{11}$, while 5 to 10 times higher figures are common for more permeable elastomers, especially natural rubber.

A second property to be sought for an impervious coating is good ability to withstand the cold. Obviously, it is not desirable that a coating become brittle or crack temperature ranging around −10° C. or −15° C., which temperatures are comparatively frequent during the winter in temperate climate countries. It is desirable that satisfactory behavior be maintained through −30° C. Here, too, tires with flexible sidewalls and/or being inflated to low pressures are more demanding. The temperature of vitreous transition of the elastomers is an index which makes it possible to estimate or judge the behavior in the cold. It the majority of known elastomers, permeability and the ability to withstand the cold vary in inverse directions: an elastomer which has a very low vitreous transition temperature is greatly permeable and vice versa. However, butyl rubber is an exception in that it can very well withstand the cold and has very good imperviousness to gases.

A third essential property of an impervious coating is good affinity and good adherence to the elastomers generally used in the tire manufacture. It is rather obvious that too easy peeling off or breaking of the impervious coating must be avoided under all circumstances. This is especially important in the case of radial tires wherein the sidewalls are under great stress and are subjected to especially heavy bending and deformations. Butyl rubber is not satisfactory in this respect and the butyl rubber impervious coatings do not properly adhere to the tire carcasses.

In order to improve the affinity of the butyl rubber for the elastomer types in current use in tire manufacture, mixing with other elastomers has been suggested. However, one does not succeed in thereby improving the adherence of impervious butyl rubber coatings except at the price of considerably increased permeability.

Another solution for the improvement of the butyl rubber consists in its modification by halogenation. As a matter of fact, chlorinated butyl rubber does not offer any appreciable improvement, especially when hot. On the other hand, brominated butyl rubber shows a clearly better affinity for natural rubber while preserving essentially its qualities of impermeability and withstanding the cold. However, bromination of butyl rubber is a delicate and costly operation and furthermore, working the brominated butyl rubber is 100 percent to the aggressivity of the bromine. Finally, in some cases it may happen that the brominated butyl rubber does not have the desired adherence.

The subject of the present invention is elastomers which have excellent impermeability, close to that of butyl rubber, and at the same time sufficient ability to withstand the cold, excellent affinity for the common elastomers permitting good sticking of the coatings to the tire carcasses, and easy as well as moderately priced manufacture and use.

The impermeable elastomers in accordance with the invention comprising mixtures of a butyl rubber on the one hand, and of the homopolymer or copolymer of one or more conjugated dienes, on the other hand, are characterized in that the polymer (homopolymer or copolymer) of the conjugated diene contains a proportion of the double bonds in lateral position, such proportion ranging, for example, from 40 percent to 100 percent of the total of double bonds and preferably being in excess of 50 percent, for example from 70 percent to 90 percent, and in that the mixture contains at least 5 percent, generally from 5 percent to 50 percent, usually from 5 percent to 40 percent, and preferably from 10 percent or 20 percent to 40 percent, by weight of such polymer with double (vinyl) bonds, the balance of the elastomeric mixture being essentially the butyl rubber.

Among the polymers of conjugated dienes which can be used in accordance with the invention in order to be associated with butyl rubber, mention may be made of polyisoprene, polybutadiene, the copolymers of isoprene, of butadiene and/or styrene. In accordance with the invention, these polymers of conjugated dienes will contain a high proportion of linkings of 1–2 or 3–4 monomer units and a small proportion of cis or trans 1–4 linkings.

The butyl rubber which may be used is either normal butyl rubber—it is recalled here that butyl rubber is a copolymer of isobutylene and isoprene or another diene containing a high ratio of isobutylene, generally exceeding 95 percent—or modified butyl rubber, for example, chlorinated or even brominated butyl rubber.

Generally speaking, all types of butyl rubber known and on the market can be used.

By preference, one uses a polyisoprene with a high content of 1–2 and/or 3–4 linkings as well as a commercial normal butyl rubber or chlorinated butyl rubber.

The invention rests on the observation that the polymers of conjugated dienes have a permeability which decreases and a compatibility with the butyl rubber which increases as the content of 1–2 and/or 3–4 linkings increases. An analogy in the steric structure of the elastomers under discussion, such as may be seen by comparing their developed formulas, is enlightening in this regard. In formula I, below, we observe the structure of butyl rubber, or, to be more exact, of an isobutylene moiety in the chain. In formula II appears the structure of a 1–2 polyisoprene moiety and in formula III the structure of a 3–4 polyisoprene moiety.

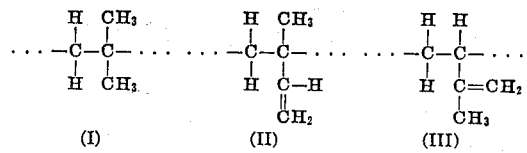

Due to the similarity in structure, the mixture in any proportion whatsoever of butyl rubber and a conjugated diene polymer with a high content of vinyl double bonds has good imperviousness. However, it is important that not less than 50 percent and preferably not less than 70 percent of butyl rubber be used if one wants to limit the diminishing of the latter quality in relation to pure butyl rubber. In this connection, it is noteworthy to state that for high proportions of butyl rubber, the influence of this elastomer is preponderant in the permeability of the mixture: it is, as a matter of fact, below that which would be furnished by the law of proportions. Furthermore, it is also advisable to maintain a high proportion of butyl rubber in order to have good ability to withstand the cold. It is a fact that the temperatures of vitreous transition of elastomers with low permeability, such as the homopolymers or copolymers of isoprene or butadiene with a high content of vinyl double bonds are comparatively high, ranging around −15° C. as against −70° C. for butyl rubber. On the other hand, it suffices to use a comparatively low proportion of homopolymers or copolymers of a conjugated diene with a high content of vinyl double bonds in order to considerably improve the affinity of the mixture to the elastomer used habitually in tire manufacture. Using a convenient system of vulcanization, one easily achieves covulcanization with butyl rubber as well as covulcanization with the customary elastomers of the polymers with a high proportion of vinyl double bonds.

In accordance with a special embodiment of the invention, one should use for combination with butyl rubber preferably polymers of conjugated dienes with a comparatively low molecular weight, for example, with an intrinsic viscosity ranging from 0.5 to 2, and preferably from 1 to 1.5. It is a fact that these polymers facilitate the improvement of workability while butyl rubber is comparatively difficult to work for the pertinent purposes.

The polymers with a high content of vinyl double bonds may be obtained by means of any suitable system of polymerization. However, it is of special advantage to undertake polymerization in solution by means of an organolithium catalyst, for example, n-butyl lithium and in the presence of a polar compound. The content of vinyl double bonds may be quite easily regulated by means of concentration of polar compound in the polymerization medium. In these polymerization systems, it is important to proceed at a low temperature so as to obtain more double bonds in lateral position and at least to avoid a substantial temperature rise.

Set forth below are some examples of polymers with a high content of lateral double bonds.

EXAMPLE 1

Into a capsuled bottle of 250 cm.$^3$, one introduces by means of a syringe 170 cm.$^3$ of purified heptane. The oxygen and any remaining impurities are removed by means of bubbling rectified nitrogen through it. Thereafter, the following are added successively:
  34 cm.$^3$ isoprene
  0.0063 g. active n-butyl lithium
  0.046 g. hexamethylphosphorotriamide The bottle is immediately placed in a bath thermostatically maintained at 25° C. After 3 hours, an antioxidant is added to the flask and the polymer thus obtained and antioxidized by an acetone-methanol mixture is coagulated. The polymer is dried under a vacuum at 70° C.

The characteristics of the polymer obtained are as follows:
  Intrinsic viscosity measured by 0.1 percent solution in toluene: 1.5
  Vitreous transition temperature: −14° C.
  Microstructure:
    3-4 content–59 percent
    1-2 content–16 percent
    trans 1-4 content–5 percent We see that 75 percent of the double bonds are in lateral position.

EXAMPLE 2

Into a small closed reaction provided with an agitator, a plunger tube and lateral tubing for introduction of the substances, one places in a nitrogen atmosphere:
  1,460 cm.$^3$ heptane
  235 g. isoprene
  0.47 g. active n-butyl lithium
  16 cm.$^3$ purified tetrahydrofuran The reaction is left to proceed for 3 hours at 45° C. The polymer, which is suitably antioxidized, coagulated and dried, has the following properties:
  Intrinsic viscosity: 1.15
  Vitreous transition temperature: −13° C.
  Microstructure:
    3-4 content–60 percent
    1-2 content–11 percent
    trans 1-4 content–7 percent

EXAMPLE 3

By means of the same apparatus as in the preceding example, one prepares an isoprene-styrene copolymer with approximately 10 percent styrene from the following starting materials:
  1800 cm.$^3$ heptane
  205 g. isoprene
  13 g. styrene
  0.047 g. active n-butyl lithium
  0.088 g. hexamethylphosphorotriamide The polymer obtained has the following characteristics:
  Intrinsic viscosity: 1.1
  Vitreous transition temperature: −10° C.
  Microstructure:
    3-4 content–48 percent
    1-2 content–12 percent The mixture of a polymer with a high content of lateral double bonds and normal butyl rubber or chlorinated butyl rubber such as on the market can be undertaken without any difficulty in a roller mixer.

In order to prepare from this mixed elastomer a mixture suitable for impervious coating, it is advisable that the customary ingredients be added to it, such as carbon black, stearic acid, zinc oxide and vulcanization system.

A formula for a mixture that may be used is, for example, the following:

|  | Weight Parts |
| --- | --- |
| Elastomer | 100 |
| Stearic Acid | 1 |
| F E F carbon black | 25 |
| SRF carbon black | 25 |
| Zinc oxide | 5 |
| Sulfur | 1 |
| Diorthotolyl guanidine | 2 |
| Phenyl beta-naphthylamine | 1 |

The curve in the drawing shows the variation in permeability of a mixture for impervious coating made up in accordance with the preceding formula, as a function of the butyl rubber and polyisoprene contents. A commercial product sold under the name of HT 1066 by the Esso Company was used as the butyl rubber. The polyisoprene used was that in Example 1, above.

The curve in the drawing shows the predominant influence of the butyl rubber on the permeability value of the mixture. For high butyl rubber contents, this influence is more than proportional to the butyl rubber content. We see that the curve in the vicinity of point A shows a slope which is clearly more accentuated than the slope of the straight line connecting points A and B corresponding respectively to the pure butyl rubber and pure polyisoprene.

With a content of 75 percent butyl rubber and 25 percent polyisoprene, the permeability is 6 instead of 5 as for the pure butyl rubber, i.e., practically unchanged.

For a butyl rubber content exceeding 50 percent one obtains both a satisfactory ability to withstand the cold and an impermeability very much superior to that of mixtures containing butyl rubber and natural rubber in equal proportions.

As concerns the force of adherence, the following table shows the values for adherence of mixtures of butyl rubber and polyisoprene as per Example 1, composed in accordance with the preceding formula, to a customary mixture such as used in the manufacture of tire carcasses.

| Percent Chlorinated Butyl Rubber | Strength of Adherence | Remarks |
|---|---|---|
| 100 | 1 to 2 kg./cm. | 100 percent detachment at the interface |
| 90 | 10 kg./cm. | 70 percent detachment at the interface |
| 80 | 10 to 30 | 50 percent detachment at the interface |
| 70 (and less) | exceeding the resistance of the rubber | Rupture outside of the interface |

The strength of adherence is calculated by means of the force necessary to detach or to tear a test piece consisting of two layers of elastomers, each elastomer layer adhering with one of its surfaces to the other layer while being attached to a rigid support by means of the other surface. The mixture to be tested constitutes one of the layers while the other layer consists of a classical mixture such as used in tire manufacture. Adhesion produced by vulcanization under pressure is considered satisfactory if in attempting to separate the two layers by means of a tractive force, tearing occurs in the mass of the test piece and not at the interface of the two layers.

Evidently, the spirit of the invention will not be exceeded by using mixtures containing in addition to normal or halogenated butyl rubber and to homopolymer or copolymer of isoprene or butadiene with a high 1-2 or 3-4 content, a classical elastomer, for example, natural rubber or a polymer or synthetic copolymer of isoprene or butadiene.

Likewise, it is understood that the impermeable elastomers in accordance with the invention may be used in any applications where low permeability, good ability to resist cold, a good affinity for other elastomers, and easy utilization are desired.

What is claimed is:

1. An elastomer composition, the vulcanizate of which is impermeable, cold-resistant and and adherent to other elastomers, comprising a mixture of (a) from about 50 to about 95 percent by weight of a butyl rubber selected from the group consisting of normal butyl rubber, chlorinated butyl rubber and brominated butyl rubber, each being the copolymer of at least about 95 percent by weight isobutylene and the balance a diene monomer copolymerizable therewith and (b) from about 50 percent to about 5 percent by weight respectively of a polymer of a conjugated diene selected from the group consisting of polyisoprene, polybutadiene, copolymers of isoprene and styrene and copolymers of butadiene and styrene, each having from about 40 percent to about 90 percent of its double bonds in a lateral position.

2. The elastomer composition as defined by claim 1 wherein the amount of the butyl rubber is from about 60 percent to about 80 percent by weight and the amount of the polymer of a conjugated diene is from about 40 percent to about 20 percent by weight respectively.

3. The elastomer composition as defined by claim 1 wherein the polymer of a conjugated diene has an intrinsic viscosity measured by 0.1 percent solution in toluene of from about 0.5 to about 2.

4. The elastomer composition as defined by claim 1 wherein the polymer of a conjugated diene has from about 70 percent to about 90 percent of its double bonds in a lateral position.

5. The elastomer composition as defined by claim 1 wherein the butyl rubber is normal butyl rubber and the polymer of a conjugated diene is polyisoprene.

PO-1050
(5/69)

UNITED STATES PATENT OFFICE
CERTIFICATE OF CORRECTION

Patent No. 3,607,984      Dated September 21, 1971

Inventor(s) Jean-Marie Massoubre

It is certified that error appears in the above-identified patent and that said Letters Patent are hereby corrected as shown below:

Line 2 of title appearing on face of patent and in column 1, "CONJUGATION" should be -- CONJUGATED --. Column 1, lines 25 and 26, "5 x $10^{18} cm^3 cm.cm^{12} sec^{11} atm.^{11}$" should be -- 5 x $10^{-8} cm^3 cm.cm^{-2} sec^{-1} atm.^{-1}$ --; line 30, "crack temperature" should be -- crack at temperatures --; line 38, "It" should be -- In --; lines 69 and 70, delete "100 percent" and insert -- hazardous due --. Column 5, lines 5-10, under the caption in the table labeled "Strength of Adherence" the first three entries should be placed as follows:

-- 1 to 2
         kg./cm.

10
         kg./cm.

10 to 30
         kg./cm.    --.

Signed and sealed this 4th day of April 1972.

(SEAL)
Attest:

EDWARD M. FLETCHER, JR.
Attesting Officer

ROBERT GOTTSCHALK
Commissioner of Patents